US012623465B2

(12) United States Patent
Ota

(10) Patent No.: US 12,623,465 B2
(45) Date of Patent: May 12, 2026

(54) PRINT DEVICE

(71) Applicant: BROTHER KOGYO KABUSHIKI KAISHA, Nagoya (JP)

(72) Inventor: Shoko Ota, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 160 days.

(21) Appl. No.: 18/319,439

(22) Filed: May 17, 2023

(65) Prior Publication Data

US 2023/0373225 A1 Nov. 23, 2023

(30) Foreign Application Priority Data

May 18, 2022 (JP) ................................ 2022-081931

(51) Int. Cl.
*B41J 2/21* (2006.01)

(52) U.S. Cl.
CPC ............... *B41J 2/2132* (2013.01); *B41J 2/21* (2013.01)

(58) Field of Classification Search
CPC . B41J 2/2132; B41J 2/21; B41J 3/4075; B41J 29/13; B41J 29/38; G06T 2207/10024; G06T 7/0004; G06T 2207/30144
See application file for complete search history.

(56) References Cited

U.S. PATENT DOCUMENTS

| | | | |
|---|---|---|---|
| 5,700,096 A | 12/1997 | Satoh et al. | |
| 2004/0057768 A1 | 3/2004 | Oshino et al. | |
| 2014/0093139 A1 | 4/2014 | Yamagishi | |
| 2020/0241816 A1 | 7/2020 | Miyazaki | |
| 2021/0303218 A1 | 9/2021 | Nakamura | |
| 2023/0406003 A1* | 12/2023 | Seki | B41J 2/2146 |

FOREIGN PATENT DOCUMENTS

| | | | |
|---|---|---|---|
| JP | H6-297739 A | | 10/1994 |
| JP | H09240120 A | | 9/1997 |
| JP | 2001277738 A | * | 10/2001 |
| JP | 2004-160981 A | | 6/2004 |
| JP | 2005059248 A | | 3/2005 |
| JP | 2014071045 A | | 4/2014 |
| JP | 2020-116898 A | | 8/2020 |
| JP | 2021059022 A | | 4/2021 |
| JP | 2021112897 A | | 8/2021 |
| JP | 2021-160253 A | | 10/2021 |

* cited by examiner

*Primary Examiner* — Justin Seo
(74) *Attorney, Agent, or Firm* — Kenealy Vaidya LLP

(57) ABSTRACT

A print device includes a print head, a conveyer, a reader, a processor, and a memory. The memory is configured to store computer-readable instructions that, when executed by the processor, instruct the processor to perform processes. The processes include print processing of printing an identification code in the print region, reading processing of acquiring a read image obtained as a result of the reader reading the identification code printed in the print region, judgment processing of judging whether a print quality of the identification code satisfies a predetermined standard, and result print processing of, when it is judged that the print quality does not satisfy the predetermined standard, printing, in the print region, a VOID image indicating, using a color different to a color of the identification code, and at a position at which at least a part of the VOID image overlaps the identification code.

14 Claims, 9 Drawing Sheets

FIG. 6

| SPECIFIC EXAMPLE | ADDITIONAL INFORMATION | VOID IMAGE | NG POSITION IMAGE |
|---|---|---|---|
| FIRST SPECIFIC EXAMPLE | NONE | SAME COLOR SYSTEM : MAGENTA | NONE |
| SECOND SPECIFIC EXAMPLE | SAME COLOR AS VOID IMAGE : MAGENTA | SAME COLOR SYSTEM : MAGENTA | NONE |
| THIRD SPECIFIC EXAMPLE | COLOR DIFFERENT FROM VOID IMAGE : MAGENTA | SAME COLOR SYSTEM : CYAN | NONE |
| FOURTH SPECIFIC EXAMPLE | SAME COLOR SYSTEM : MAGENTA | NONE | SAME COLOR SYSTEM : RED |
| FIFTH SPECIFIC EXAMPLE | SMALLEST USAGE FREQUENCY | GREATEST REMAINING AMOUNT | NONE |

F
FRONT
RIGHT
LEFT
REAR
M2
GA2
GB2
G2
GC
GD
GE
serial No XXXX2
RANK C NG
REPRINT NEXT PAGE

PRINT DEVICE

REFERENCE TO RELATED APPLICATIONS

This application claims priority from Japanese Patent Application No. 2022-081931 filed May 18, 2022. The entire content of the priority application is incorporated herein by reference.

BACKGROUND ART

The present disclosure relates to a print device.

A print device of known art judges whether or not the print quality of an identification code is acceptable or unacceptable, after the identification code is printed on a label adhered to a long label base sheet. On a label for which the print quality is judged to be unacceptable, the print device prints a shaded image over substantially the whole region of the label, and information indicating a judgment reason.

DESCRIPTION

The print device of the known art prints the shaded image and the information indicating the judgment reason using a thermal transfer ribbon that is an ink supply source. Thus, in the print device of the known art, due to the printing of the shaded image and the information indicating the judgment reason, a period of time from a start of using the ink supply source to the consumption of the ink supply source becomes shorter, and replacement of the ink supply source becomes more frequent.

Embodiments of the broad principles derived herein provide a print device that, compared to known art, suppresses an increase in a replacement frequency of an ink supply source, when printing an image indicating that a print quality is unacceptable.

Embodiments provide a print device that includes a print head, a conveyer, a reader, a processor, and a memory. The print head is configured to perform color printing of an image on a predetermined print region of a medium, using inks supplied from a plurality of ink supply sources having mutually different colors of ink. The conveyer is configured to convey the medium in a conveyance direction and in a return direction opposite to the conveyance direction. The reader is provided downstream of the print head in the conveyance direction, and configured to read the image printed in the print region. The processor is configured to control the print head, the conveyer, and the reader. The memory is configured to store computer-readable instructions that, when executed by the processor, instruct the processor to perform processes. The processes include print processing of controlling the conveyer and the print head and printing an identification code in the print region, reading processing of, after the print processing, controlling the conveyer and the reader to acquire a read image obtained as a result of the reader reading the identification code printed in the print region, and judgment processing of judging, based on the read image, whether or not a print quality of the identification code satisfies a predetermined standard. The processes include result print processing of, when it is judged in the judgment processing that the print quality does not satisfy the predetermined standard, controlling the conveyer and the print head, to print, in the print region, a VOID image indicating that the predetermined standard is not satisfied, using a color different to a color of the identification code, and at a position at which at least a part of the VOID image overlaps the identification code. When it is judged that the print quality does not satisfy the predetermined standard, compared to a case in which the VOID image is printed using the same color as the color of the identification code, the result print processing of the print device contributes to suppressing an increase in a replacement frequency of an ink supply source supplying the ink used for printing the identification code.

Embodiments also provide a print device that includes a print head, a conveyer, a reader, a processor, and a memory. The print head is configured to perform color printing of an image on a predetermined print region of a medium, using inks supplied from a plurality of ink supply sources having mutually different colors of ink. The conveyer is configured to convey the medium in a conveyance direction and in a return direction opposite to the conveyance direction. The reader is provided downstream of the print head in the conveyance direction, and configured to read the image printed in the print region. The processor is configured to control the print head, the conveyer, and the reader. The memory is configured to store computer-readable instructions that, when executed by the processor, instruct the processor to perform processes. The processes include print processing of controlling the conveyer and the print head and printing an identification code in the print region, reading processing of, after the print processing, controlling the conveyer and the reader to acquire a read image obtained as a result of the reader reading the identification code printed in the print region, and judgment processing of judging, based on the read image, whether or not a print quality of the identification code satisfies a predetermined standard. The processes include result print processing of, when it is judged in the judgment processing that the print quality does not satisfy the predetermined standard, controlling the conveyer and the print head, to prim, in the print region, a VOID image indicating that the predetermined standard is not satisfied, using a first color and at a position at which at least a part of the VOID image overlaps the identification code, and additional information added in accordance with a judgment result of the judgment processing, using a second color different to the first color. When it is judged that the print quality does not satisfy the predetermined standard, compared to a case in which the VOID image and the additional information are printed in the same color as each other, the result print processing of the print device contributes to suppressing the increase in the replacement frequency of the ink supply source supplying the ink used for printing the identification code.

Embodiments further provide a print device that includes a print head, a conveyer, a reader, a processor, and a memory. The print head is configured to perform color printing of an image on a predetermined print region of a medium, using inks supplied from a plurality of ink supply sources having mutually different colors of ink. The conveyer is configured to convey the medium in a conveyance direction and in a return direction opposite to the conveyance direction. The reader is provided downstream of the print head in the conveyance direction, and configured to read the image printed in the print region. The processor is configured to control the print head, the conveyer, and the reader. The memory is configured to store computer-readable instructions that. When executed by the processor, instruct the processor to perform processes. The processes include print processing of controlling the conveyer and the print head and printing an identification code in the print region, reading processing of, after the print processing, controlling the conveyer and the reader to acquire a read image obtained as a result of the reader reading the identification code printed in the print region, and judgment processing of judging, based on the read image, whether or not a print quality of the identification code satisfies a predetermined standard. The processes include result print processing of, when it is judged in the judgment processing that the print quality does not satisfy the predetermined standard, controlling the conveyer and the print head, to prim, in the print region, additional information added in accordance with a judgment result of the judgment processing, using a color different from a color of the identification code. When it is judged that the print quality does not satisfy the predetermined standard, compared to a case in which the additional information is printed using the same color as the color of the identification code, the result print processing of the print device contributes to suppressing an increase in a replacement frequency of an ink supply source supplying the ink used for printing the identification code.

FIG. 6 is an explanatory diagram of settings, for specific examples, of additional information, a VOID image, and an NG position image.

Figure 1:
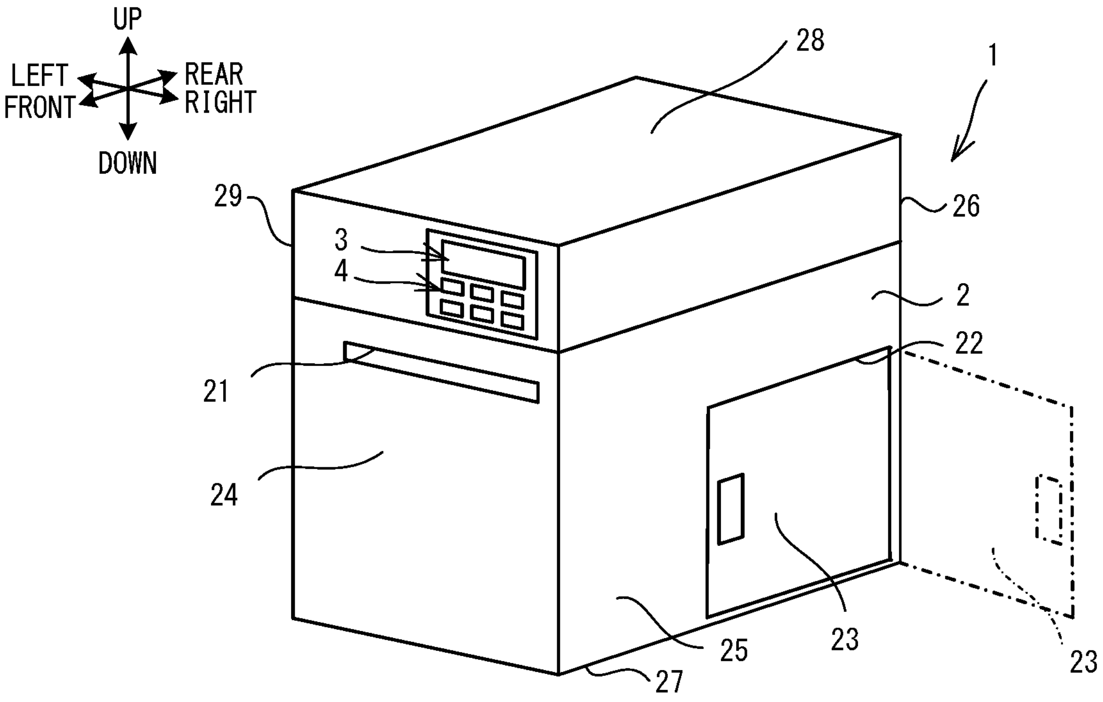
FIG. 1 is a perspective view of a print device.

A print device 1 according to an embodiment of the present disclosure will be described with reference to the drawings. The drawings that are referenced are used to illustrate the technical characteristics that can be employed by the present disclosure. The configurations and the like of the devices that are described are not intended to be limited thereto, but are merely illustrative examples. In the description of the present embodiment, the left lower side, the right upper side, the right lower side, the left upper side, the upper side, and the lower side in FIG. 1 are, respectively, the front side, the rear side, the right side, the left side, the upper side, and the lower side of the print device 1.

A physical configuration of the print device 1 will be described with reference to FIG. 1 through FIG. 3. As illustrated in FIG. 1, the print device 1 is provided with a housing 2, a display unit 3, and an operation unit 4. The housing 2 includes a front wall 24, a right wall 25, a rear wall 26, a lower wall 27, an upper wall 28, a left wall 29, and a cover 23. The housing 2 is a cuboid shape of a size that can be placed on a table. A discharge opening 21 and an opening 22 are formed in the housing 2. The discharge opening 21 is formed in a, rectangular shape that is long in the left-right direction in a front view, in the front wall 24 of the housing 2. The opening 22 is formed in a rectangular shape in a, right side view, in a rear lower portion of the right wall 25 of the housing 2. The cover 23 is a plate having a rectangular shape in a right side view, and is supported at a rear lower portion of the right side surface of the housing 2 such that the cover 23 can rotate between a closed position (illustrated using a solid line in FIG. 1) in which the opening 22 is closed, and an open position (illustrated using an alternate long and short dash line in FIG. 1) in which the opening 22 is open. The display unit 3 is provided at an upper right portion in the front surface of the front wall 24 of the housing 2, and displays an image. The operation unit 4 is provided below the display unit 3, of the upper right portion of the front surface of the front wall 24 of the housing 2, and is configured by a plurality of buttons used to input various commands. The display unit 3 and the operation unit 4 are provided above the discharge opening 21.

Figure 2:
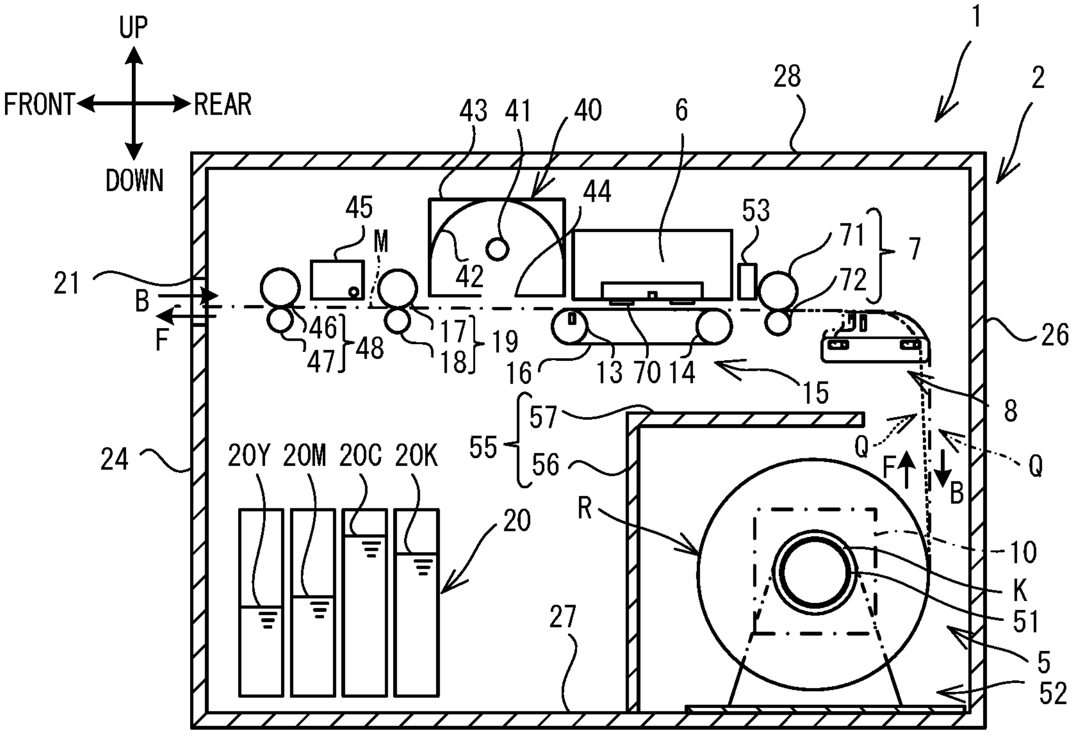
FIG. 2 is a cross-sectional view illustrating an internal configuration of the print device.

As illustrated in FIG. 2, the print device 1 houses, inside the housing 2, a supply portion 5, conveyers 7, 10, 15, 19, and 48, a partition wall 55, a tension applying portion 8, a medium detector 53, a print head 6, a fixing unit 40, and a reader 45. The print device 1 is an inkjet printer configured to perform printing on a medium M. The medium M is a long medium wound in a roll shape on a tubular paper tube K, for example. As illustrated in FIG. 3, the medium M includes the long base sheet M1 and the plurality of labels M2 attached to the base sheet M1. Each of the labels M2 is a rectangular shape whose length in a lengthwise direction is a length L and whose length in the width direction orthogonal to the lengthwise direction is a width W. The plurality of labels M2 are adhered at equal intervals to the base sheet M1 in the conveyance direction F at an interval J. The print device 1 according to the present embodiment is a color inkjet printer that performs printing using inks of a plurality of colors.

The supply portion 5 is provided to the left of the cover 23 that is in the closed position illustrated by the solid line in FIG. 1, and in a space in a rear lower portion of the print device 1 surrounded by the partition wall 55 and the rear wall 26 illustrated in FIG. 2. The supply portion 5 holds a roll R. The roll R is a roll on which the medium M is wound in the roll shape. The supply portion 5 of the present embodiment is provided with a shaft portion 51 and a magazine 52. The shaft portion 51 extends in the left-right direction, and is inserted through the paper tube K of the roll R. The magazine 52 is a support base having a U-shape in a front view. The magazine 52 supports both left and right ends of the shaft portion 51 such that the shaft portion 51 can rotate around an axis extending in the left-right direction. The shaft portion 51 is detachably supported by the magazine 52. The magazine 52 is detachably supported by the print device 1. When a user of the print device 1 replaces the roll R, the user disposes the cover 23 in the open position illustrated in FIG. 1, detaches the magazine 52 illustrated in FIG. 2 from inside the housing 2, and performs the replacement operation of the roll R. The partition wall 55 includes a first wall portion 56 extending upward from the lower wall 27 of the housing 2, and a second wall portion 57 extending to the rear from the upper end of the first wall portion 56, and partitions the internal space of the housing 2. The second wall portion 57 is separated from the rear wall 26 of the housing 2 in the front-rear direction.

The print head 6 prints an image on the medium M supplied from the supply portion 5. The print head 6 of the present embodiment is provided with a plurality of nozzles 70 that discharge ink in a discharge direction, and is an inkjet head that performs the printing of the image on the medium M by discharging the ink from the plurality of nozzles 70. The discharge direction of the present embodiment is the downward direction, and the print head 6 is provided in a posture in which the plurality of nozzles 70 are oriented downward, above a conveyance path Q of the medium M. The conveyance path Q is a path along which the medium M fed out from the supply portion 5 is conveyed until the medium M is discharged to the outside of the housing 2 from the discharge opening 21. The ink is supplied to the print head 6, via a tube that is not illustrated, from a tank 20 disposed inside the housing 2. The tank 20 is provided for each type of the ink. Four of the tanks 20 are provided, for example, and a yellow ink 20Y, a magenta ink 20M, a cyan ink 20C, and a black ink 20K are respectively stored therein. The inks of each of the tanks 20 are supplied to the corresponding nozzles 70.

The conveyer 7 conveys the medium M a conveyance direction F from the supply portion 5 to the print head 6, and in a return direction B that is the opposite direction to the conveyance direction F. The conveyance direction F is a direction along the conveyance path Q from the supply portion 5 toward the print head 6. The conveyance direction F is a direction intersecting the left-right direction that is an extending direction of the rotation axis of the roll R, and is a direction that changes in accordance with the position on the conveyance path Q. The conveyance direction F from the supply portion 5 to the tension applying portion 8 is a direction that changes in accordance with a remaining amount of the medium M, and when the remaining amount of the medium M is an initial value, that is, the remaining amount immediately after the replacement of the roll R, as illustrated in FIG. 2, the conveyance direction F is substantially upward. The conveyance direction F front the tension applying portion 8 to the discharge opening 21 is substantially to the front. In other words, in the print device 1, at a section at which the medium M comes into contact with the tension applying portion 8, the conveyance path Q bends, and the conveyance direction F changes from upward toward the front.

The conveyer 7 is provided upstream of the print head 6 in the conveyance direction F, and downstream of the supply portion 5 in the conveyance direction F. In other words, the conveyer 7 is provided between the print head 6 and the supply portion 5, on the conveyance path Q of the medium M. The conveyer 7 of the present embodiment includes a conveyance roller 71 and a pinch roller 72 that rotate around axes extending in the left-right direction, and nips and conveys the medium M by sandwiching the medium M from above and below between the conveyance roller 71 and the pinch roller 72.

Figure 4:
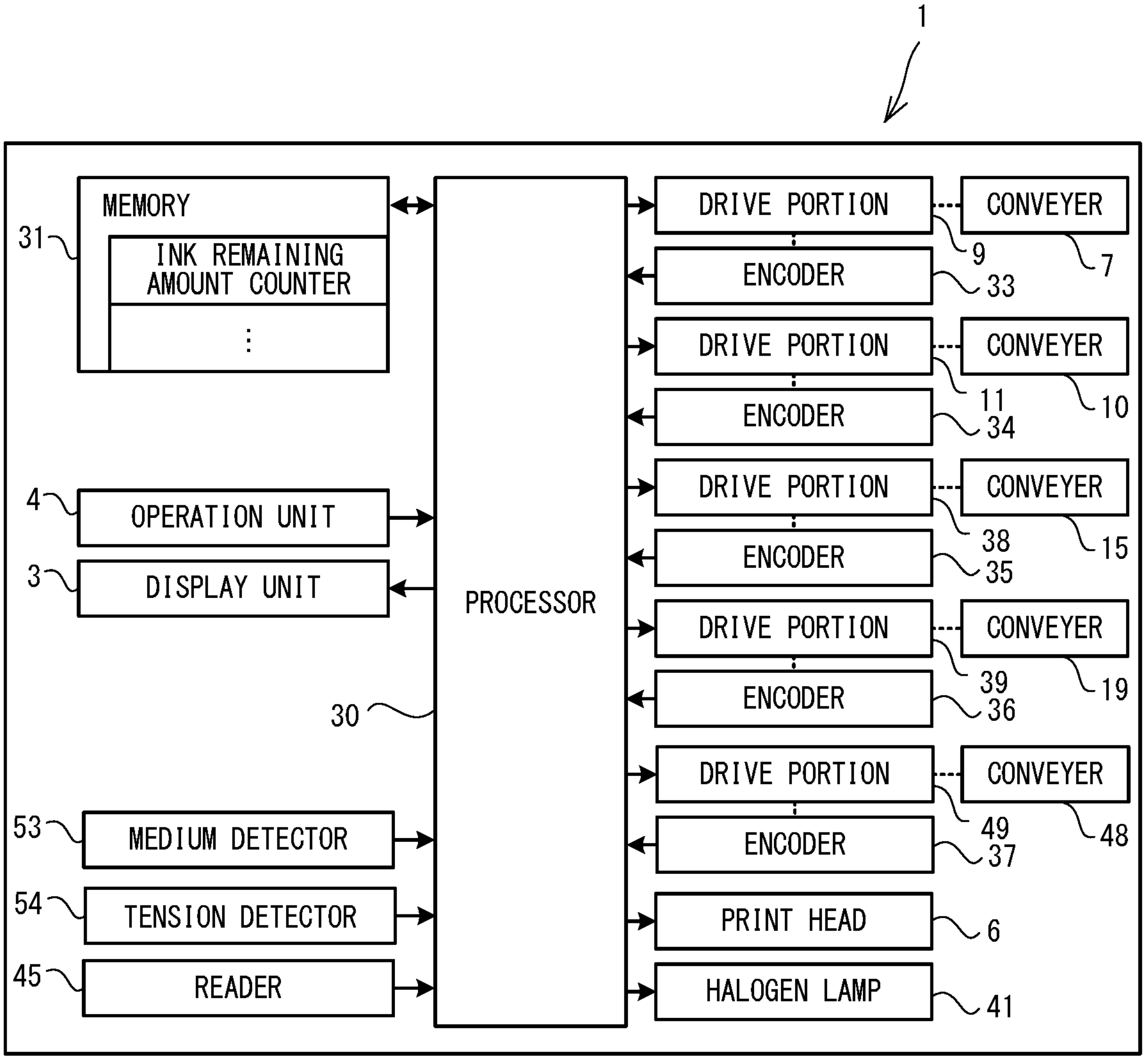
FIG. 4 is a block diagram illustrating an electrical configuration of the print device.

The medium detector 53 outputs a detection result of the medium M to a processor 30 illustrated in FIG. 4. The medium detector 53 of the present embodiment is a transmission type sensor or a reflection type sensor. When the medium detector 53 is the reflection type sensor, for example, the medium detector 53 detects a leading end of a label M2, using a difference in reflectivity between a base sheet M1 and the label M2. The base sheet M1 is provided with a plurality of holes provided in rows at a predetermined interval in the conveyance direction F, and, when the medium detector 53 is the transmission type sensor, for example, the medium detector 53 detects the leading end of the label M2 on the basis of whether or not light passes through the plurality of holes in the base sheet M1.

The conveyer 10 is provided downstream of the conveyer 7 in the conveyance direction F, and conveys the medium M in the conveyance direction F and the return direction B. The conveyer 10 of the present embodiment rotates the roll R held by the supply portion 5, conveys the medium M in the return direction B, and winds the medium M onto the roll R. The conveyer 10 of the present embodiment detachably engages with the shaft portion 51 of the supply portion 5. The conveyer 10 rotates the roll R held by the supply portion 5, conveys the medium M in the conveyance direction F, and feeds out the medium M from the roll R toward the print head 6.

The tension applying portion 8 applies a tension to the medium M on the conveyance path Q, between the supply portion 5 and the conveyer 7. The tension is a tension that acts in the reverse direction to a progress direction of the medium M. The tension applying portion 8 is disposed downstream of the conveyer 7 in the conveyance direction F, and upstream of the conveyer 10 in the conveyance direction F. The tension applying portion 8 is in contact with the medium M and urges the medium M in a direction intersecting the conveyance direction F. In other words, the tension applying portion 8 is provided between the conveyer 7 and the conveyer 10 on the conveyance path Q. The tension applying portion 8 is provided to the rear of the conveyer 7 and above the supply portion 5.

The conveyer 15 is provided below the print head 6, and downstream of the conveyer 7 in the conveyance direction F, and conveys the medium M in the conveyance direction F. The conveyer 15 is provided with a drive roller 13, a driven roller 14, and an endless belt 16. The drive roller 13 and the driven roller 14 are separated from each other in the front-rear direction. The endless belt 16 is stretched between the drive roller 13 and the driven roller 14. The driven roller 14 rotates in accordance with the rotation of the endless belt 16. The upper end on an outer peripheral surface of the endless belt 16 is in substantially the same position, in the up-down direction, as the section of the medium M that is nipped by the conveyer 7, and faces the plurality of nozzles 70 of the print head 6. In the conveyance direction F, the upper end on the outer peripheral surface of the endless belt 16 supports and conveys, from below, the medium M conveyed between the conveyer 7 and the conveyer 19, in a state of sucking the medium M against the endless belt 16 using static electricity or a negative pressure.

The fixing unit 40 is disposed downstream of the print head 6 in the conveyance direction F, and upstream of the conveyer 19 in the conveyance direction F. The fixing unit 40 is a halogen heater and includes a halogen lamp 41, a reflective plate 42, and a housing 43. An opening 44 in the left-right direction is formed in a lower wall of the housing 43. The fixing unit 40 radiates infrared rays through the opening 44, and heats the medium M passing directly below the opening 44. In this way, the ink G discharged by the print head 6 onto the medium M is fixed to the medium M.

The conveyer 19 is provided downstream of the print head 6 and the fixing unit 40 in the conveyance direction F, and upstream of the reader 45 and the discharge opening 21 in the conveyance direction F. The conveyer 19 conveys the medium M in the conveyance direction F and the return direction B. The conveyer 19 includes a conveyance roller 17 and a pinch roller 18 that rotate around axes extending in the left-right direction, and nips and conveys the medium M by sandwiching the medium M from above and below between the conveyance roller 17 and the pinch roller 18.

The reader 45 is provided downstream of the print head 6 and the conveyer 19 in the conveyance direction F, and upstream of the discharge opening 21 in the conveyance direction F. The reader 45 is positioned directly above the conveyance path Q. The reader 45 optically reads an image printed on the surface of the label M2 of the medium M, and outputs an image signal representing the read image. The reader 45 is, for example, a line image sensor, such as a contact image sensor (CIS) that is long in the width direction of the medium M, that is, in the left-right direction.

The conveyer 48 is provided downstream of the reader 45 in the conveyance direction F, and upstream of the discharge opening 21 in the conveyance direction F. The conveyer 48 conveys the medium M in the conveyance direction F and the return direction B. The conveyer 48 includes a conveyance roller 46 and a pinch roller 47 that rotate around axes extending in the left-right direction. The conveyer 48 nips and conveys the medium NI by sandwiching the medium M from above and below between the conveyance roller 46 and the pinch roller 47.

The electrical configuration of the print device 1 will be described with reference to FIG. 4. The print device 1 is provided with the processor 30, and with a memory 31, the operation unit 4, the display unit 3, drive portions 9, 11, 38, 39, and 49, the print head 6, the halogen lamp 41, encoders 33 to 37, the medium detector 53, a tension detector 54, and the reader 45, which are electrically connected to the processor 30. The processor 30 controls the print device 1, and controls the print head 6, the halogen lamp 41, the drive portions 9, 11, 38, 39, and 49, and the display unit 3. The memory 31 includes a ROM, a RAM, a flash memory, and the like that store various parameters and the like necessary when the processor 30 executes various programs.

The drive portion 9 rotationally drives the conveyer 7 under the control of the processor 30. The drive portion 11 rotationally drives the conveyer 10 under the control of the processor 30. Under the control of the processor 30, the drive portion 38 rotates the endless belt 16 of the conveyer 15, by rotating the drive roller 13 of the conveyer 15. The drive portion 39 rotationally drives the conveyer 19 under the control of the processor 30. The drive portion 49 rotationally drives the conveyer 48 under the control of the processor 30. Each of the drive portions 9, 11, 38, 39, and 49 is a stepping motor that can perform forward and reverse rotation, for example. The encoder 33 inputs a value, to the processor 30, in accordance with a drive amount of the drive portion 9. The encoder 34 inputs a value, to the processor 30, in accordance with a drive amount of the drive portion 11. The encoder 35 inputs a value, to the processor 30, in accordance with a drive amount of the drive portion 38. The encoder 36 inputs a value, to the processor 30, in accordance with a drive amount of the drive portion 39. The encoder 37 inputs a value, to the processor 30, in accordance with a drive amount of the drive portion 49. The tension detector 54 outputs, to the processor 30, a detection result in accordance with the tension applied by the tension applying portion 8 to the medium M between the tension applying portion 8 and the conveyer 7.

Main processing performed by the processor 30 of the print device 1 will be described with reference to FIG. 5 to FIG. 9F, using first to fifth specific examples illustrated in FIG. 6. The first to fifth specific examples differ from each other with respect to settings when a printing judgment for the image printed on the label M2 is an NG result. When a power source of the print device 1 is turned ON, the processor 30 reads out a program for performing the main processing from a memory 31, and performs the following processing. In the following description, each of steps of the processing is abbreviated to "S". Each of the main processing according to the first to fifth specific examples are performed at mutually different timings, but, for ease of explanation, the main processing according to the first to fifth specific examples are described in parallel to each other. At the start of the main processing, the medium M is sandwiched by the conveyer 7, and attributes of the medium M have been input into the print device 1 by the user. On the basis of the attributes of the medium M, the processor 30 sets a region of the medium M to which the label M2 is adhered as a print region. In FIGS. 7A-7E and FIGS. 8A-8D, each of a position PA at which the leading end of the medium M is detected by the medium detector 53, a print position PB of printing by the print head 6, a fixing position PC of fixing by the fixing unit 40, and a read position PD of reading by the reader 45 are schematically illustrated. An end portion, on a downstream in the conveyance direction F, of the N-th label M2 in a print order is schematically illustrated as a label position P(N). The conveyance of the medium M in the conveyance direction F is also referred to as "forward feed," and the conveyance of the medium M in the return direction B is also referred to as "reverse feed".

Figure 5:
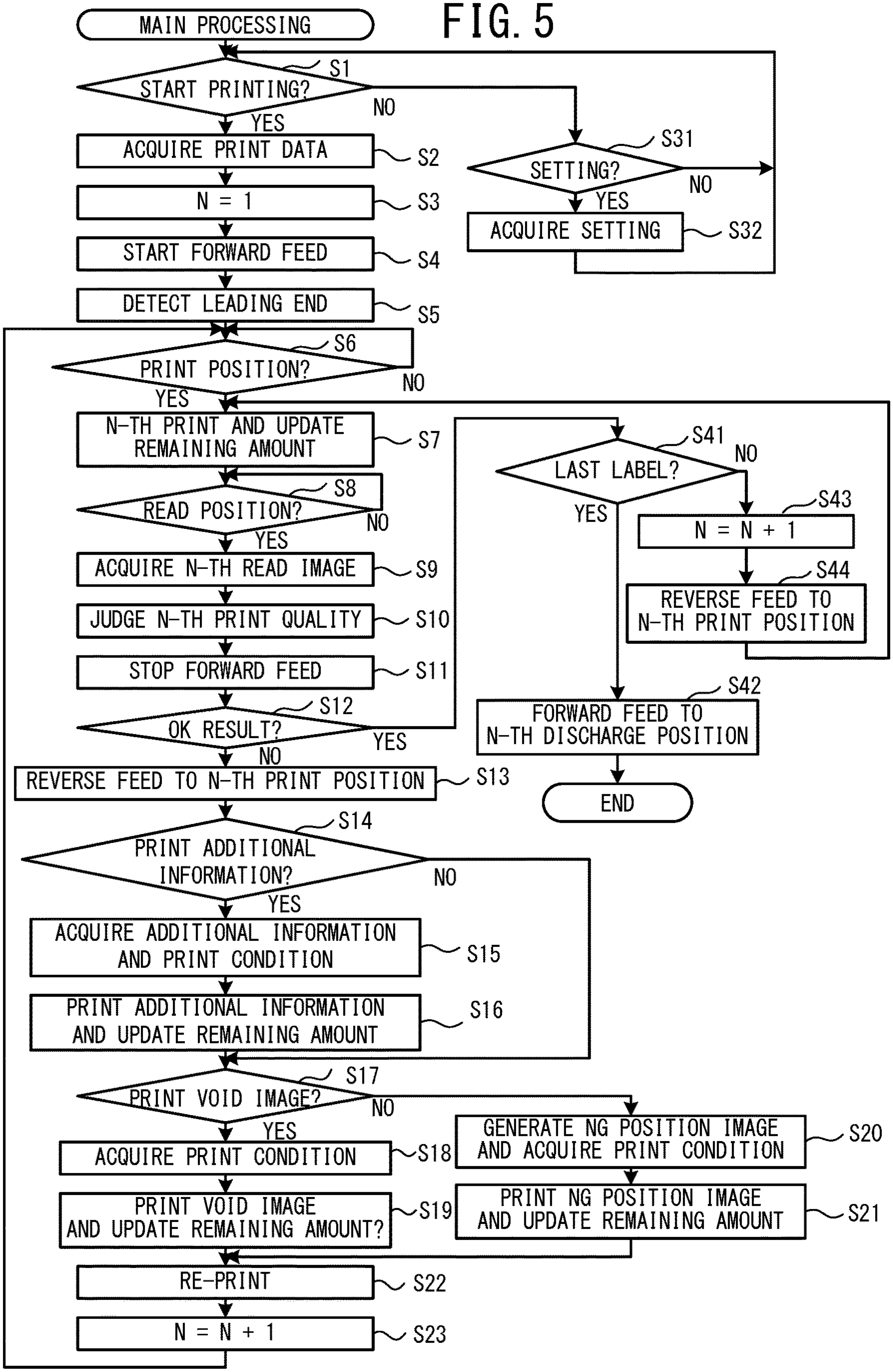
FIG. 5 is a flowchart of main processing.

As illustrated in FIG. 5, the processor 30 determines whether an input of a print start command has been detected (S1). The user of the print device 1 operates the operation unit 4 and, after specifying print data for printing an image including an identification code, inputs the print start command. The identification code is a code representing various types of information, using an arrangement of machine-readable character strings, symbols, patterns, or the like. The identification code may be, for example, a one-dimensional code, a two-dimensional code, and the like. The one-dimensional code may be a barcode, for example. The two-dimensional code may be a OR code (registered trademark), a VeriCode, a CP code, an AztecCode, a PDF417, and the like.

When the input of the print start command has not been detected (no at S1), the processor 30 determines whether an input has been detected of a setting for when a print quality judgment result is an unacceptable judgment (S31). When the print quality judgment result for the image printed on the target label M2 is the unacceptable judgment, the print device 1 of the present embodiment prints at least one selected from a group of additional information, a VOID image, and an NG position image on the target label M2, in accordance with specified conditions. In the present embodiment, the user can set a color of the ink to be used in the printing, as a print condition of each of the additional information, the VOID image, and the NG position image.

The additional information is information added in accordance with the judgment result when the print quality is judged to be unacceptable. The print device 1 of the present embodiment performs the print quality judgment using each of a plurality of judgment items, depending on the type of the identification code. When the identification code is the one-dimensional barcode, there are six judgment items, which are, for example, symbol contrast, minimum reflectance, minimum edge contrast, modulation, defect, and ease of decoding. The additional information of the present embodiment represents a ranking classified as a result of considering judgment results of the six judgment items overall. The ranking is represented, for example, by the alphabetic characters A to E in order from the highest print quality. Furthermore, the additional information of the present embodiment includes information specifying the print region for re-printing the identification code for which the print quality has been judged to be unacceptable. The additional information of the present embodiment is information represented by characters and symbols, and is information printed at a position not overlapping the identification code, in the print region.

The VOID image is an image illustrating that the print quality of the image does not satisfy a predetermined standard. The VOID image is printed at a position at which at least a part of the VOID image overlaps the identification code. The VOID image of the present embodiment is an image printed to overlap with the print region of the barcode. For example, the VOID image is an image that fills in the print region of the barcode with a predetermined pattern. The print device 1 of the present embodiment determines the color of the VOID image in accordance with whether or not to cause the barcode printed on the target label M2 to be unreadable by an identification code reader, such as a barcode reader. Specifically, when causing the barcode printed on the target label M2 to be unreadable, the print device 1 sets the color of the VOID image to a color of the same color system as a complementary color of a color of the visible light irradiated by the identification code reader. When the color of the visible light is red, the print device 1 sets the color to the same color system as cyan, which is a complementary color of red. In the present embodiment, the color of the same color system refers to a color that, when the Munsell hue circle is divided into 100 and the hue of one comparison objective color is used as a reference (a zero position), and the colors divided into 100 are represented from +0 to +50 in the counterclockwise direction and from −0 to −50 in the clockwise direction, the hue of another comparison objective color is in a hue range of ±10. For example, when the Munsell hue circle is divided into 100, a color having a hue in the hue range of ±10 with respect to cyan is referred to as being in the same color system as cyan. When causing the barcode printed on the target label M2 to be readable, the print device 1 sets the color of the VOID image to a color of the same color system as the color of the visible light irradiated by the identification code reader. When the color of the visible light is red, the print device 1 sets the color of the VOID image to a color of the same color system as red. Taking the color of the visible light as red, the print device 1 of the present embodiment prints the VOID image using one type of ink. Thus, when causing the barcode printed on the target label M2 to be unreadable, the print device 1 sets the color of the VOID image to be cyan, and when causing the barcode printed on the target label M2 to be readable, the print device 1 sets the color of the VOID image to be magenta.

An NG position image is an image clarifying a position of a portion for which the print quality has been judged to be unacceptable. The NG position image of the present embodiment is an image representing, using a specified color, a portion, of line segments configuring the barcode, for which the print quality has been judged to be unacceptable.

The user of the print device 1 can operate the operation unit 4 and input settings. As illustrated in FIG. 6, in the conditions of the first specific example, settings are made to not print the additional information and the NG position image, and to print the VOID image in the color of the same color system as red. In the conditions of the second specific example, settings are made to not print the NG position image, to print the VOID image in the color of the same color system as red, and to print the additional information in the same color as the color used to print the VOID image. In the conditions of the third specific example, settings are made to not print the NG position image, to print the VOID image in the color of the same color system as a complementary color of red, and to print the additional information in a different color from the color used to print the VOID image. In the conditions of the fourth specific example, settings are made to not print the VOID image, and to print each of the additional information and the NG position image in a color of the same color system as red. In the conditions of the fifth specific example, settings are made to not print the NG position image, to print the VOID image using an ink for which a remaining amount is greatest, and to print the additional information using the ink, of the colors of the plurality of inks, for which a usage frequency is smallest when used for the target label M2. When the target label M2 is printed using the black ink 20K and the yellow ink 20Y, the ink for which the usage frequency is smallest is selected from the magenta ink 20M and the cyan ink 20C. When the input of the settings has been detected (yes at S31), the processor 30 acquires the input settings and stores the input settings in the memory 31 (S32). When the input of the settings has not been detected (no at S31), or after S32, the processor 30 returns the processing to S1.

Figure 3:
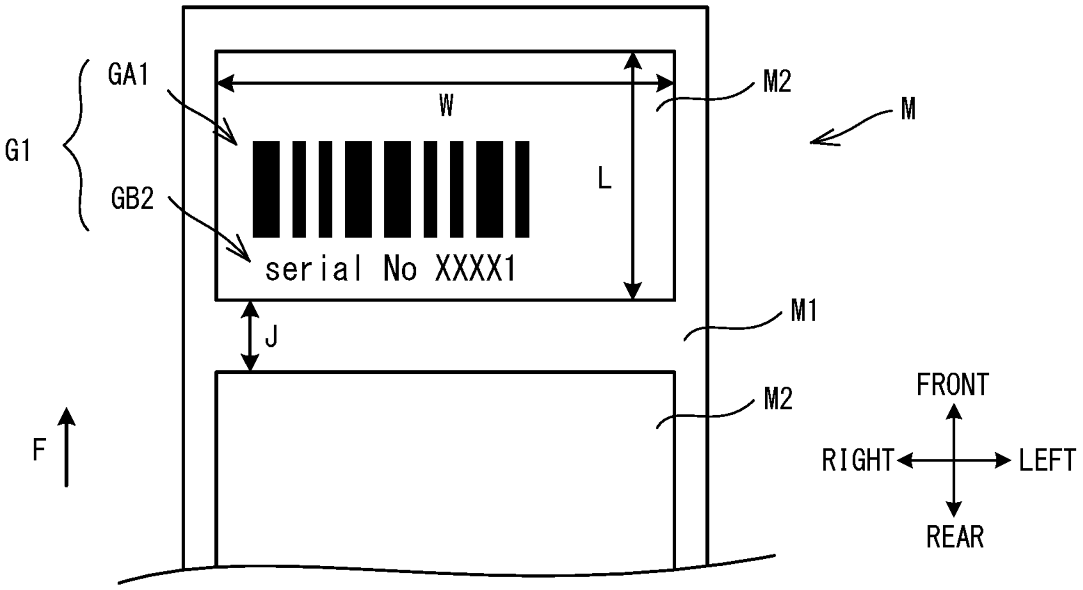
FIG. 3 is an explanatory diagram of a medium provided with a base sheet and a plurality of labels, and an image printed on the medium.

As illustrated in FIG. 3, in the first specific example to the fifth specific example, after specifying the print data for continuously printing, a predetermined number of times, an image G(N) including an identification code GA(N) and character information GB(N), the user inputs the print start command. Note that, in the identification code GA(N), the character information GB(N), and the image G(N), N indicates the print order. The identification code GA(N) is a one-dimensional barcode that is N-th in the print order. The character information GB(N) is a serial number that is N-th in the print order. The images G(N) may be the same regardless of the print order, or may be different from one another. The image G(N) may be printed using one type of ink, or may be printed using a plurality of types of ink. The image G(N) of the present embodiment is printed using the black ink 20K. When the print start command has been detected (yes at S1), the processor 30 acquires the specified print data (S2).

Figures 7A, 7B, 7C, 7D, 7E:
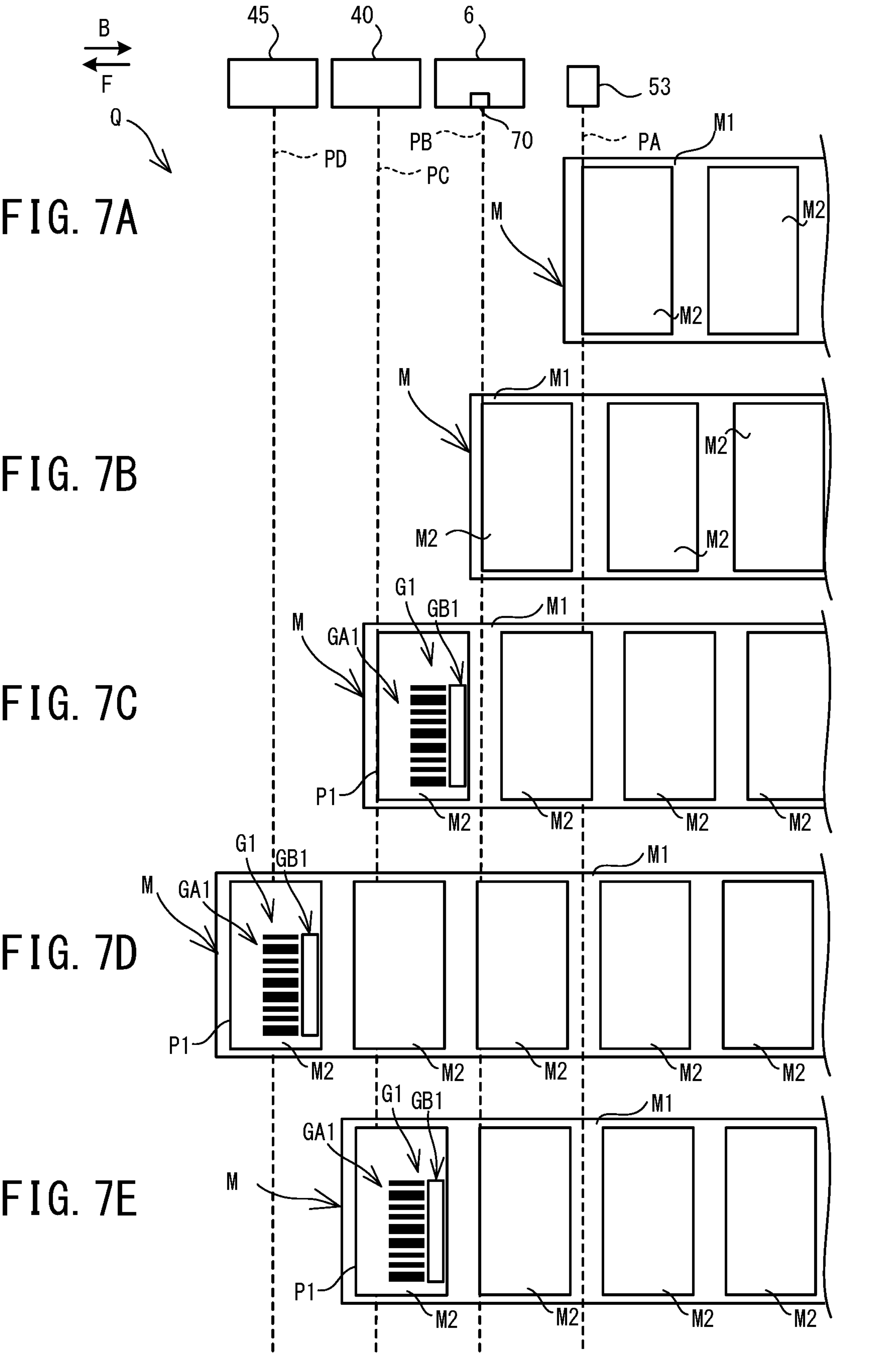
FIGS. 7A-7E are explanatory diagrams of processing relating to images.

The print device 1 sets the variable N representing the print order to 1 (S3). The processor 30 controls the drive portions 9, ii, 38, 39, and 49, and starts to convey the medium M in the conveyance direction F (S4). As illustrated in FIG. 7A, on the basis of the detection result of the medium detector 53, the processor 30 detects a leading end position P1 of the label M2 that is first in the print order and that borders the leading end of the medium M, and stores the leading end position P1 as an origin position (S5). The processor 30 determines whether the N-th label M2 from the leading end of the medium M has reached the print position PB (S6). The N-th label M2 from the leading end of the medium M is also referred to as the "target label M2". The processor 30 determines whether the target label M2 has reached the print position PB on the basis of the drive amounts of the drive portions 9, 11, 38, 39, and 49 after the detection of the origin position, the attributes of the medium M, and a distance from the position PA to the print position PB. When the target label M2 has not reached the print position PB (no at S6), the processor 30 continues the processing at S6 until the target label M2 reaches the print position PB. As illustrated in FIG. 7B, when the variable N is 1, when the target label M2 has reached the print position PB (yes at S6), the processor 30 prints an image G1 on the target label M2, in accordance with the print data acquired at S2 (S7). As illustrated in FIG. 7C, after printing the image G1 on the target label M2, the processor 30 updates an ink remaining amount counter stored in the memory 31, on the basis of an ink amount used for the printing.

The processor 30 determines whether the target label M2 has reached the read position PD (S8). The processor 30 determines whether the target label M2 has reached the read position PD on the basis of the drive amounts of the drive portions 9, 11, 38, 39, and 49 after the detection of the origin position, the attributes of the medium M, and a distance from the position PA to the read position PD. When the target label M2 has not reached the read position PD (no at S8), the processor 30 continues the processing at S8 until the target label M2 reaches the read position PD. As illustrated in FIG. 7D, when the target label M2 has reached the read position PD (yes at S8), the processor 30 controls the reader 45, reads the image printed on the target label M2, and acquires the read image (S9). On the basis of the read image acquired at S9, the processor 30 judges the print quality of the image on the target label M2 (S10). The processor 30 of the present embodiment performs the judgement as to whether the above-described six judgment items satisfy the predetermined conditions, and, when all of the judgment items satisfy each of the predetermined conditions, determines the judgment result to be an OK result, and stores the variable N and the judgment result in the memory 31. When at least one of the above-described six judgment items does not satisfy the predetermined conditions, the processor 30 determines the judgment result to be an NG result, and stores the variable N, the judgment result, and the additional information to be added in accordance with the judgment result in the memory 31. The processor 30 controls the drive portions 9, 11, 38, 39, and 49, and stops the conveyance started at S4, of the medium M in the conveyance direction F (S11).

The processor 30 determines whether the judgment result, stored at S10, of the print quality of the target label M2 is the OK result (S12). When the variable N is 1, it is determined that the judgment result of the print quality is the OK result (yes at S12), and the processor 30 determines, on the basis of the print data, whether the target label M2 is the last label M2 in the print order (S41). When the target label M2 is not the last label M2 in the print order (no at S41), the processor 30 increments the variable N by 1 (S43). The processor 30 controls the drive portions 9, 11, 38, 39, and 49 and, as illustrated in FIG. 7E, conveys the second label M2 in the return direction B to the print position PB (S44). The processor 30 returns the processing to S7.

Figures 8A, 8B, 8C, 8D:
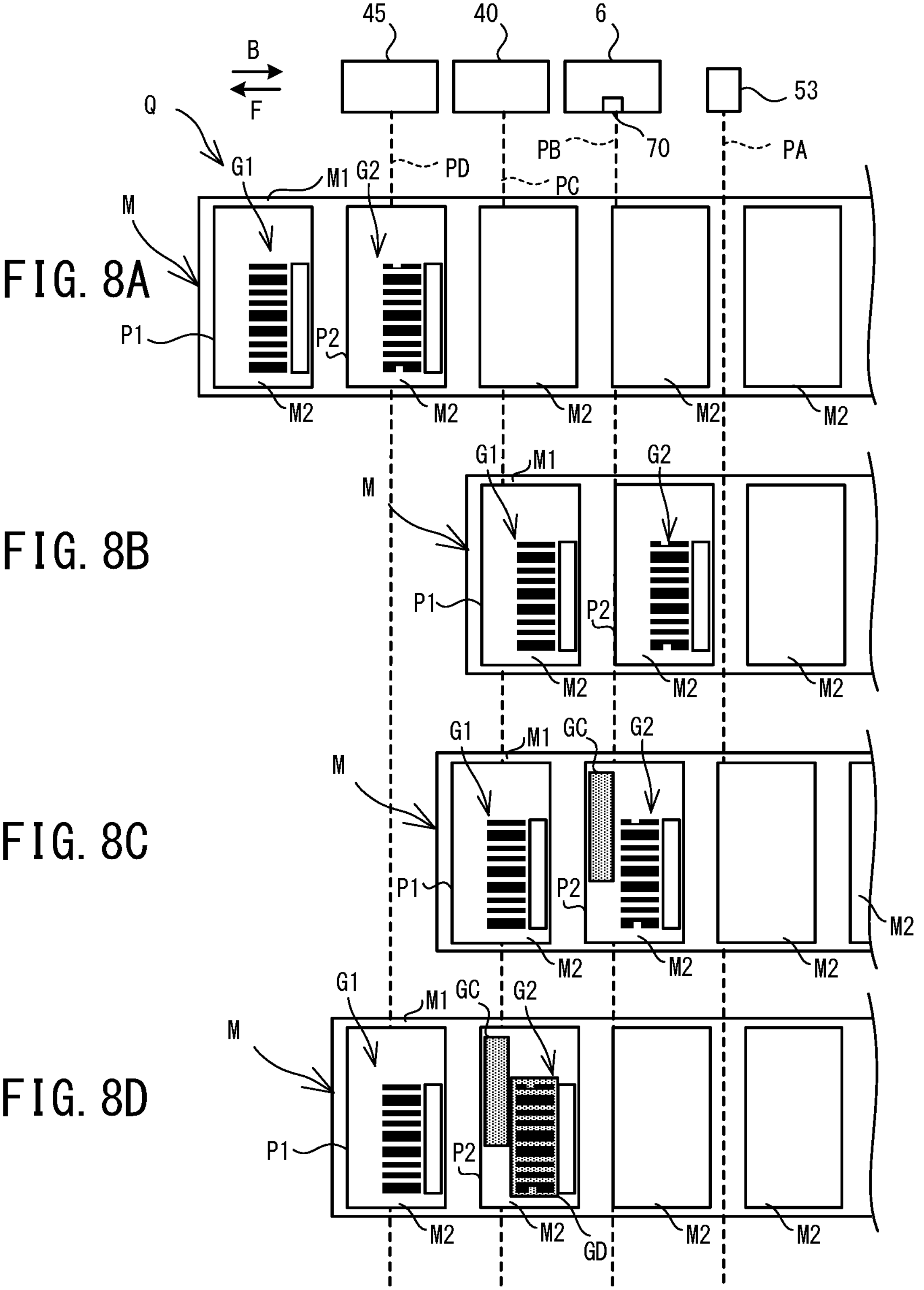
FIGS. 8A-8D are explanatory diagrams of processing relating to images.
Figures 9A, 9B, 9C, 9D, 9E, 9F:
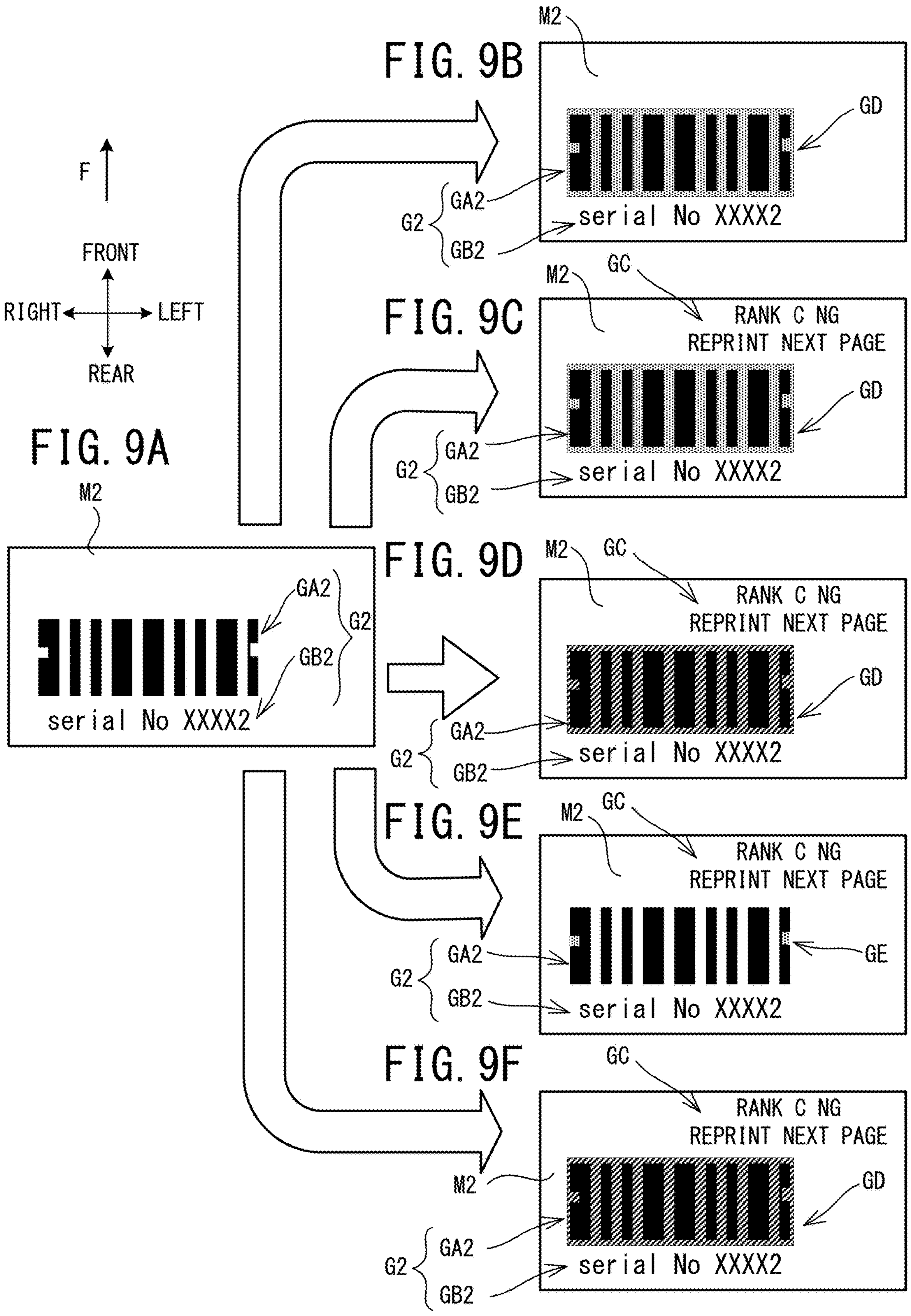
FIGS. 9A-9F are explanatory diagrams of images representing a print quality NG judgment, according to the specific examples.

As illustrated in FIG. 8A and FIG. 9A, when the variable N is 2, when the print quality judgment result for an image G2 printed on the target label M2 is the NG result (no at S12), the processor 30 controls the drive portions 9, 11, 38, 39, and 49 and, as illustrated in FIG. 8B, conveys the target label M2 in the return direction B to the print position PB (S13). The processor 30 determines whether a setting has been made to print additional information GC (S14). As illustrated in FIG. 6, in each of the second to fifth specific examples, the setting has been made to print the additional information GC (yes at S14). In this case, the processor 30 refers to the memory 31, and acquires the additional information GC and the print condition of the additional information GC (S15). The processor 30 acquires "RANK C NG", "REPRINT NEXT PAGE" as the additional information GC of the second to fifth specific examples. In the additional information GC, "PAGE" corresponds to the print region, that is, to the label M2, "REPRINT NEXT PAGE" indicates that the next print region in the print order is specified as the print region for re-printing the identification code GA(N) for which the print quality has been judged to be unacceptable. The processor 30 acquires magenta as the print condition of the second to fourth specific examples. The processor 30 acquires cyan as the print condition of the fifth specific example, on the basis of the print data. The processor 30 prints the additional information GC acquired at S15 on the target label M2, using the print condition acquired at S15. The processor 30 of the present embodiment prints the additional information GC on a front left portion of the image G2. The additional information GC does not overlap with an identification code GA2. As illustrated in FIG. 8C, and FIG. 9C to FIG. 9F, after printing the additional information GC on the target label M2, the processor 30 updates the ink remaining amount counter stored in the memory 31, on the basis of the ink amount used for the printing.

As in the first specific example, when the setting to print the additional information GC has not been made (no at SN), or following S16, the processor 30 determines whether the setting has been made to print a VOID image GD (S17). As illustrated in FIG. 6, in each of the first to third specific examples, and the fifth specific example, the setting has been made to print the VOID image GD (yes at S17). In this case, the processor 30 refers to the memory 31, and acquires the print condition of the VOID image GD (518). The processor 30 acquires magenta as the print condition of the first and second specific examples. The processor 30 acquires cyan as the print condition of the third and fifth specific examples. The processor 30 prints the VOID image GD on the target label M2, using the print condition acquired at 518. The processor 30 of the present embodiment prints the VOID image GD at a position covering the identification code GA2 of the image G2. In other words, a minimum rectangle encompassing the identification code GA2 is smaller than a minimum rectangle encompassing the VOID image GD. The minimum rectangle encompassing the identification code GA2 is disposed inside the minimum rectangle encompassing the VOID image GD. As illustrated in FIG. 8D, FIG. 9B to FIG. 9D, and FIG. 9F, after printing the VOID image GD on the target label M2, the processor 30 updates the ink remaining amount counter stored in the memory 31, on the basis of the ink amount used for the printing.

In the fourth specific example, since the setting has not been made to print the VOID image GD (no at S17), the processor 30 generates an NG position image GE indicating the NG position, and acquires magenta as the print condition of the NG position image GE (S20). The processor 30 generates, as the NG position image GE according to the fourth specific example, an image represented by the color specified by the print condition, as a rectangle indicating a portion, of the identification code GB, judged to be missing. The processor 30 prints the NG position image GE acquired at S20, using the acquired print condition (S21). As illustrated in FIG. 9E, after printing the NG position image GE on the target label M2, the processor 30 updates the ink remaining amount counter stored in the memory 31, on the basis of the ink amount used for the printing.

As a result of the above-described processing from S14 to S21, in each of the first specific example to the fifth specific example, the mutually different images are printed on the target label M2. Specifically, as illustrated in FIG. 9B, in the first specific example, the VOID image GD is printed in magenta. As illustrated in FIG. 9C, in the second specific example, the VOID image GD is printed in magenta, and the additional information GC is printed in magenta that is the same color as the color used for printing the VOID image GD. As illustrated in FIG. 9D, in the third specific example, the VMD image GD is printed in cyan, which is in the same color system as the complementary colors of red, and the additional information GC is printed in magenta, which is a separate color from the color used for printing the VOID image GD. As illustrated in FIG. 9E, in the fourth specific example, the additional information GC and the NG position image GE are both printed in magenta, which is in the same color system as red. As illustrated in FIG. 9F, the VOID image GD of the fifth specific example is printed using the cyan ink 20C that is the ink for which the remaining amount is greatest, and the additional information GC is printed using the magenta ink 20M that is the ink, of the colors of the plurality of inks, for which the usage frequency is smallest when used for the target label M2.

Subsequent to S19 or S21, the processor 30 performs processing to re-print the image G(N), which includes the identification code GA(N) for which the NG judgment has been issued, in the print region specified by the additional information GC (S22). The print regions specified by the additional information GC of the present embodiment are the print region on which is printed the image G(N) for which the NG judgment has been issued, and the print region adjacent thereto upstream in the conveyance direction F. At S22, the processor 30 may perform the same processing as the processing at S8 to S12, and may perform the processing to judge the print quality of the re-printed image G(N). The processor 30 increments the variable N (S23) and returns the processing to S6. By re-printing the image G(N) including the identification code GA(N) for which the NG judgment has been issued, in the subsequent processing, in accordance with a number of times U of the re-print processing, the image G(N) is printed on the (N+U)-th print region. When the target label M2 is the last label M2 in the print order (yes at S41), the processor 30 controls the drive portions 9, 11, 38, 39, and 49, and conveys the N-th label M2 to a discharge position (S42). The discharge position of the present embodiment is a position at which the N-th label M2 is discharged to the outside of the print device 1 from the opening 22. The processor 30 thus ends the main processing.

The print device 1 of the above-described embodiment is provided with the print head 6, the conveyers 7, 10, 15, 19, and 48, the drive portions 9, 11, 38, 39, and 49, the reader 45, and the processor 30. The print head 6 is configured to perform color printing of an image, using the inks supplied from the plurality of ink supply sources for which the colors of the inks are mutually different, on the predetermined print region of the long medium M. The conveyers 7, 10, 15, 19, and 48 are configured to convey the medium M in the conveyance direction F and in the return direction B that is the opposite direction to the conveyance direction F. The drive portions 9, 11, 38, 39, and 49 are respectively configured to drive the conveyers 7, 10, 15, 19, and 48. The reader 45 is provided downstream of the print head 6 in the conveyance direction F, and is configured to read the image printed in the print region. The processor 30 controls the print head 6, the drive portions 9, 11, 38, 39, and 49, and the reader 45. The processor 30 controls the drive portions 9, 11, 38, 39, and 49 and the print head 6, and prints the identification code GA(N) in the print region, using the label M2 as the print region (S7). After the print processing (S7), the processor 30 controls the drive portions 9, 11, 38, 39, and 49 and the reader 45, and acquires the read image obtained as a result of the reader 45 reading the identification code GA(N) printed on the label M2 (S9). On the basis of the read image, the processor 30 determines whether or not the print quality of the identification code GA(N) satisfies the predetermined standard (S10). In each of the first to third specific examples and the fifth specific example, when it is judged, in the judgment processing, that the print quality does not satisfy the predetermined standard, the processor 30 controls the drive portions 9, 11, 38, 39, and 49 and the print head 6, and prints, in the print region, the VOID image GD indicating that the predetermined standard is not satisfied, using a color that is different from the color of the identification code GA(N), at a position in which at least a part of the VOID image GD overlaps the identification code GA(N) (S19). When it is judged that the print quality does not satisfy the predetermined standard, compared to a case in which the VOID image GD is printed using the same color as the color of the identification code GA(N), the processing at S19 of the print device 1 contributes to suppressing a replacement frequency from becoming higher of the ink supply source that supplies the ink used in the printing of the identification code GA(N), compared to a known art.

In the processing at S10 of the third specific example, when it is judged that the print quality does not satisfy the predetermined standard, the processor 30 controls the drive portions 9, 11, 38, 39, and 49 and the punt head 6, and prints, in the punt region, the VOID image GD indicating that the predetermined standard is not satisfied, using a first color, at a position in which at least a part of the VOID image GD overlaps the identification code GA(N) (S19), and prints the additional information GC that is added in accordance with the judgment result of the judgment processing using a second color that is different from the first color (S16). In the third specific example, compared to a case in which the VOID image GD indicating that the print quality does not satisfy the predetermined standard and the additional information GC are printed in the same color as each other, the processing at S16 and S19 of the print device 1 contributes to suppressing the replacement frequency from becoming higher of the ink supply source that supplies the ink used in the printing of the identification code GA(N).

In each of the second to fifth specific examples, when it is judged that the print quality does not satisfy the predetermined standard, in the processing at S10, the processor 30 controls the drive portions 9, 11, 38, 39, and 49 and the print head 6, and prints, in the print region, the additional information GC added in accordance with the judgment result in the processing at S10, using a color different from the color of the identification code GA(N) (S16). When it is judged that the print quality does not satisfy the predetermined standard, compared to a case in which the additional information GC is printed using the same color as the color of the identification code GA(N), the processing at S16 of the print device 1 contributes to suppressing the replacement frequency from becoming higher of the ink supply source that supplies the ink used in the printing of the identification code GA(N).

In the third specific example, in the processing at S19, the processor 30 prints the VOID image GD, using the same color system as a complementary color of red, which is the color of the visible light irradiated when the identification code reader reads the identification code GA(N) printed in the print region. The processing at S19 of the print device 1 contributes to suppressing the identification code GA(N) printed in the print region from being able to be read by the identification code reader.

In each of the first and second specific examples, in the processing at S19, the processor 30 prints the VOID image GD, using the same color system as red, which is the color of the visible light irradiated when the identification code reader reads the identification code GA(N) printed in the print region. The processing at S19 of the print device 1 contributes to both indicating, using the printing of the VOID image GD, that the print quality of the identification code GA(N) printed in the print region does not satisfy the predetermined standard, and also to verifying a reading result of the identification code GA(N) using the identification code reader.

In the fifth specific example, in the processing at S16, the processor 30 prints the additional information GC using the color for which the usage frequency in the print region is lowest, of the colors of the plurality of inks set in advance. Compared to a case in which the additional information GC is printed using a color other than the color for which the usage frequency in the print region is lowest, the processing at S16 of the print device 1 can increase the visibility of the additional information GC printed in the print region.

In the fifth specific example, in result print processing at S10, S16, and S19, respectively, the processor 30 updates the remaining amounts of each of the plurality of ink supply sources, in accordance with the ink amounts used, and, in the processing at S19, prints the VOID image GD using the ink of the ink supply source for which the remaining amount is greatest, of the plurality of ink supply sources. The processing at S19 of the print device 1, contributes to extending a period of time until any of the ink supply sources is used up, compared to a case in which the VOID image GD is printed without using the ink supply source for which the remaining amount is greatest.

In the fourth specific example, in the processing at S19, the processor 30 prints the NG position image GE representing the portion, of the identification code GA(N), that does not satisfy the predetermined standard, at a position of the portion inside the print region, using a color that is different to the color of the identification code GA(N). The processing at S19 contributes to facilitating an operation by a user of the print device 1 to identify the position of the portion that does not satisfy the predetermined standard.

In the third specific example, in the processing at S16 and S19, the processor 30 sets each of the first color and the second color to a color different from the color of the identification code GA(N), and prints the VOID image GD and the additional information GC in the print region. Compared to a case in which both the VOID image GD and the additional information GC are printed using the same color as the color of the identification code GA(N), the processing at S16 and S19 of the print device 1 contribute to suppressing the replacement frequency from becoming higher of the ink supply source that supplies the ink used in the printing of the identification code GA(N).

The additional information GC includes the information specifying the print region for re-printing the identification code GA(N) judged not to have satisfied the predetermined standard. After S16, the processor 30 re-prints, in the print region specified by the additional information GC, the identification code GA(N) judged not to have satisfied the predetermined standard (S22). Thus, the additional information of the print device 1 contributes to improving user convenience when identifying the re-printed print region. Re-print processing of the print device 1 contributes to lessening time and effort by the user to input a command to perform the re-printing of the identification code GA(N) judged not to have satisfied the predetermined standard.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The print device of the present disclosure is not limited to the above-described embodiment, and various modifications may be made without departing from the broad spirit and scope of the present disclosure. For example, the following modifications may be added as appropriate. In addition to the print device, the present disclosure may be realized in another mode, such as a print method, a print program, a computer-readable medium storing the print program, and the like.

The configuration of the medium M may be changed as appropriate, and may be, for example, fan-fold paper that is folded along perforations cut into a paper sheet. In this case, the print device 1 may set, as the print regions, respective pages of the fan-fold paper. The print device 1 may set the desired print region on the long medium M, in accordance with predetermined setting conditions. The roll R need not necessarily include the paper tube K, and may be wound in the roll shape so as to be mountable on the supply portion 5. The configuration of the print head 6 may be changed as appropriate, and the types of ink may be changed as appropriate. The print head 6 may be an electrophotographic or thermosensitive thermal head. When the print head 6 is the thermal head, the print device 1 may use an ink ribbon on which a cyan region, a magenta region, a yellow region, and a black region are alternately arranged, and may perform each of cyan printing, magenta printing, yellow printing, and black printing in accordance with the regions of the ink ribbon, by repeating forward driving of a motor, head release and reverse driving of the motor (for example, refer to Japanese Laid-Open Patent Publication No. 2001-277738, the relevant portions of which are herein incorporated by reference.) In accordance with the printing method of the print device 1, the fixing unit 40 may be omitted, or the configuration of the fixing unit 40 may be changed as appropriate. The print device 1 may be provided with a cutting unit configured to cut the medium M. The cutting unit may cut the medium M by a manual operation by the user, or may automatically cut the medium M. At least one selected from a group of the conveyers 15, 19, and 48 may be omitted as necessary, and the configuration thereof may be changed. The reader 45 may be another device, for example, such as a charge coupled device (CCD) or the like.

The program including the instructions to execute the main processing shown in FIG. 5 may be stored in a storage device of the print device 1 until the program is executed by the processor 30. Thus, a program acquisition method, an acquisition path, and a device storing the program may be changed, respectively, as appropriate. The program executed by the processor 30 may be received from another device via cable or wireless communication, and may be stored in a storage device, such as a flash memory or the like. The other device includes a PC, and a server connected via a network, for example.

Each of the steps of the main processing of the print device 1 is not limited to the example of being executed by the processor 30, and part or all of the processing may be executed by another electronic device (an ASIC, for example). Each of the steps of the main processing may be executed by distributed processing by a plurality of electronic devices (a plurality of CPUs, for example). The order of each of the steps of the main processing may be changed, the step may be omitted, or a step may be added, as necessary. A mode in which part or all of the main processing is executed by an operating system (OS) or the like operated on the print device 1 on the basis of instructions from the processor 30 is also included in the scope of the present disclosure. For example, the following changes may be added to the main processing as appropriate.

The processor 30 may omit the processing at S31 and S32, in this case, the processor 30 may perform the main processing using the settings of any one selected from a group of the first to fifth specific examples. Instead of the processing at S31 and S32, the processor 30 may perform processing that automatically sets conditions, in accordance with at least one selected from a group of the identification code GA(N), and the print data. Types and a number of the items that can be se at S31 and S32 may be changed as appropriate. The processor 30 may be configured to be able to set whether or not to perform the printing of at least one selected from the group of the additional information GC, the VOID image GD, and the NG position image GE, or may be configured to be unable to set the print conditions. In addition to the color of at least one selected from the group of the additional information GC, the VOID image GD, and the NG position image GE, the print conditions may include an arrangement and a size thereof, and the like. The print device 1 may be configured to be able to register a color of ink that is not to be used, as the color of a print target that is at least one selected from the group of the additional information GC, the VOID image GD, and the NG position image GE, and the processor 30 may print the print target using a color of ink other than the color of the registered ink. A method of setting the color of the additional information GC, the VOID image GD, and the NG position image GE may be changed as appropriate. For example, when printing both the additional information GC and the VOID image GD, one of the additional information GC or the VOID image GD may be printed using the same color as the color of the identification code GA(N). The print device 1 need not necessarily determine the color of the VOID image GD in accordance with whether or not to cause the barcode printed on the target label M2 to be unreadable by the identification code reader.

The judgment items of the print quality may be changed as appropriate in accordance with the identification code GA(N), and types, a number, and the like of the judgment items may be changed. The additional information may be changed as appropriate in accordance with the judgment items. The NG position image GE may be printed only when the NG judgment is issued for a specific judgment item, of the plurality of judgment items. It is sufficient that the VOID image GD be printed at a position at which at least a part of the VOID image GD overlaps the identification code GA(N). The print region of the VOID image GD preferably covers at least half or more of the print region of the identification code GA(N). It is sufficient that the print regions of each of the images be defined using a minimum rectangle encompassing the image, for example. A method of detecting the ink remaining amount and the usage frequency may be changed as appropriate. When the condition of the fifth specific example cannot be selected, the processor 30 need not necessarily acquire at least one selected from a group of the ink remaining amount and the ink usage frequency.

It is sufficient that the additional information be information added in accordance with the judgment result, and the additional information may be changed as appropriate. For example, the additional information need not necessarily include the information specifying the print region for re-printing the identification code GA(N) for which the print quality is judged to be unacceptable, or may include only the information specifying the print region for re-printing the identification code GA(N). A method for determining the print region for re-printing the identification code GA(N) for which the print quality is judged to be unacceptable may be changed as appropriate, and may be set by the user, or may be automatically set in accordance with the print conditions. The additional information may be information indicating a judgment reason for why the print quality is judged to be unacceptable, and may be, for example, character information representing a value relating to the judgment item, of the plurality of judgment items, judging that the print quality is unacceptable. It is sufficient that the additional information be printed at a position, of the print region, not overlapping the identification code GA(N), and the print position of the additional information may be changed as appropriate.

What is claimed is:

1. A print device comprising:

a print head configured to perform color printing of an image on a predetermined print region of a medium, using inks supplied from a plurality of ink supply sources having mutually different colors of ink;

a conveyer configured to convey the medium in a conveyance direction and in a return direction opposite to the conveyance direction;

a reader provided downstream of the print head in the conveyance direction, and configured to read the image printed in the print region;

a processor configured to control the print head, the conveyer, and the reader; and a memory configured to store computer-readable instructions that, when executed by the processor, instruct the processor to perform processes comprising:

print processing of controlling the conveyer and the print head and printing an identification code in the print region;

reading processing of, after the print processing, controlling the conveyer and the reader to acquire a read image obtained as a result of the reader reading the identification code printed in the print region;

judgment processing of judging, based on the read image, whether or not a print quality of the identification code satisfies a predetermined standard; and result print processing of, when it is judged in the judgment processing that the print quality does not satisfy the predetermined standard, controlling the conveyer and the print head, to print, in the print region, a VOID image indicating that the predetermined standard is not satisfied, using a color different from a color of the identification code, and at a position at which at least a part of the VOID image overlaps the identification code, wherein the result print processing includes printing the VOID image using the same color system as a complementary color of red, red being the color of visible light irradiated when an identification code reader reads the identification code printed in the print region.

2. A print device comprising:

a print head configured to perform color printing of an image on a predetermined print region of a medium, using inks supplied from a plurality of ink supply sources having mutually different colors of ink;

a conveyer configured to convey the medium in a conveyance direction and in a return direction opposite to the conveyance direction;

a reader provided downstream of the print head in the conveyance direction, and configured to read the image printed in the print region;

a processor configured to control the print head, the conveyer, and the reader; and a memory configured to store computer-readable instructions that, when executed by the processor, instruct the processor to perform processes comprising:

print processing of controlling the conveyer and the print head and printing an identification code in the print region;

reading processing of, after the print processing, controlling the conveyer and the reader to acquire a read image obtained as a result of the reader reading the identification code printed in the print region;

judgment processing of judging, based on the read image, whether or not a print quality of the identification code satisfies a predetermined standard; and result print processing of, when it is judged in the judgment processing that the print quality does not satisfy the predetermined standard, controlling the conveyer and the print head, to print, in the print region, a VOID image indicating that the predetermined standard is not satisfied, using a first color and at a position at which at least a part of the VOID image overlaps the identification code, and additional information added in accordance with a judgment result of the judgment processing, using a second color different from the first color, wherein the result print processing includes:

in a case where the VOID image causes the identification code printed in the print region to be unreadable by an identification code reader, printing the VOID image using the same color system as a complementary color of red, red being the color of visible light irradiated when the identification code reader reads the identification code printed in the print region, and in a case where the VOID image causes the identification code printed in the print region to be readable by the identification code reader, printing the VOID image using the same color system as red.

3. A print device comprising:

a print head configured to perform color printing of an image on a predetermined print region of a medium, using inks supplied from a plurality of ink supply sources having mutually different colors of ink;

a conveyer configured to convey the medium in a conveyance direction and in a return direction opposite to the conveyance direction;

a reader provided downstream of the print head in the conveyance direction, and configured to read the image printed in the print region;

a processor configured to control the print head, the conveyer, and the reader; and a memory configured to store computer-readable instructions that, when executed by the processor, instruct the processor to perform processes comprising:

print processing of controlling the conveyer and the print head and printing an identification code in the print region;

reading processing of, after the print processing, controlling the conveyer and the reader to acquire a read image obtained as a result of the reader reading the identification code printed in the print region;

judgment processing of judging, based on the read image, whether or not a print quality of the identification code satisfies a predetermined standard; and result print processing of, when it is judged in the judgment processing that the print quality does not satisfy the predetermined standard, controlling the conveyer and the print head, to print, in the print region, additional information added in accordance with a judgment result of the judgment processing, using a color different from a color of the identification code, wherein the result print processing includes printing, in the print region, a VOID image indicating that the predetermined standard is not satisfied, using a color different from a color of the identification code, and at a position at which at least a part of the VOID image overlaps the identification code, in a case where the VOID image causes the identification code printed in the print region to be unreadable by an identification code reader, printing the VOID image using the same color system as a complementary color of red, red being the color of visible light irradiated when the identification code reader reads the identification code printed in the print region, and in a case where the VOID image causes the identification code printed in the print region to be readable by the identification code reader, printing the VOID image using the same color system as red.

4. The print device according to claim 2, wherein the result print processing includes printing the VOID image using the same color system as the complementary color of red.

5. The print device according to claim 2, wherein the result print processing includes printing the VOID image using the same color system as red.

6. The print device according to claim 2, wherein the result print processing includes printing the additional information using a color, of a plurality of colors set in advance, for which a usage frequency in the print region is lowest.

7. The print device according to claim 3, wherein the result print processing includes further printing an NG position image representing a portion, of the identification code, not satisfying the predetermined standard, the NG position image being printed at a position of the portion in the print region, using a color different from the color of the identification code.

8. The print device according to claim 2, wherein the result print processing includes setting each of the first color and the second color to a color different from the color of the identification code, and printing the VOID image and the additional information in the print region.

9. The print device according to claim 3, wherein the additional information includes information specifying a print region for re-printing the identification code judged not to satisfy the predetermined standard, and the computer-readable instructions further instruct the processor to perform a process comprising:

re-print processing, after the print processing, of re-printing, in the print region specified by the additional information, the identification code judged not to satisfy the predetermined standard.

10. A print device comprising:

a print head configured to perform color printing of an image on a predetermined print region of a medium, using inks supplied from a plurality of ink supply sources having mutually different colors of ink;

a conveyer configured to convey the medium in a conveyance direction and in a return direction opposite to the conveyance direction;

a reader provided downstream of the print head in the conveyance direction, and configured to read the image printed in the print region;

a processor configured to control the print head, the conveyer, and the reader; and a memory configured to store computer-readable instructions that, when executed by the processor, instruct the processor to perform processes comprising:

print processing of controlling the conveyer and the print head and printing an identification code in the print region;

reading processing of, after the print processing, controlling the conveyer and the reader to acquire a read image obtained as a result of the reader reading the identification code printed in the print region;

judgment processing of judging, based on the read image, whether or not a print quality of the identification code satisfies a predetermined standard; and result print processing of, when it is judged in the judgment processing that the print quality does not satisfy the predetermined standard, controlling the conveyer and the print head, to print, in the print region, a VOID image indicating that the predetermined standard is not satisfied, using a color different from a color of the identification code, and at a position at which at least a part of the VOID image overlaps the identification code, wherein the result print processing includes:

in a case where the VOID image causes the identification code printed in the print region to be unreadable by an identification code reader, printing the VOID image using the same color system as a complementary color of red, red being the color of visible light irradiated when the identification code reader reads the identification code printed in the print region, and in a case where the VOID image causes the identification code printed in the print region to be readable by the identification code reader, printing the VOID image using the same color system as red.

11. The print device according to claim 10, wherein the result print processing includes printing the VOID image using the same color system as the complementary color of red.

12. The print device according to claim 10, wherein the result print processing includes printing the VOID image using the same color system as red.

13. The print device according to claim 11, further comprising an operation unit, wherein the result print processing includes printing the VOID image using a color based on whether the identification code printed in the print region is to be readable or unreadable by the identification code reader based on input through the operation unit.

14. The print device according to claim 12, further comprising an operation unit, wherein the result print processing includes printing the VOID image using a color based on whether the identification code printed in the print region is to be readable or unreadable by the identification code reader based on input through the operation unit.

* * * * *